HENRY S. LESHER, OF NEW YORK, N. Y.

IMPROVEMENT IN THE MANUFACTURE OF SOAP.

Specification forming part of Letters Patent No. 147,413, dated February 10, 1874; application filed January 7, 1874.

*To all whom it may concern:*

Be it known that I, HENRY S. LESHER, of New York, in the county of New York and State of New York, have invented certain new and useful Improvements in Chlorinated Soap; and I do hereby declare that the following is a full, clear, and exact description thereof.

The nature of my invention consists in a new compound for soap, as will be hereinafter more fully set forth.

I first make a lye, as follows: Take one pound of caustic soda and put it in an iron kettle containing seven pints of water. Put it on a moderate fire and heat gradually to 230° or 240° Fahrenheit, stirring occasionally with a glass or a clean iron rod until it is entirely dissolved. In another vessel, slack very gradually one-fourth pound of shell lime. When it is thoroughly slaked to a fine powder, add only sufficient water so that when it becomes cool it will be a solid mass. Then add enough more water to it to make a thick, creamy paste. Then add it gradually to the caustic-soda solution, which must be kept gradually boiling, stirring continually. After the lime has all been added, let the mixture boil slowly for two hours, at a heat not exceeding 220° Fahrenheit, stirring occasionally. Then let it stand to settle at least twelve hours, when it can be drawn off with a siphon. Then add another pint of water to the precipitate. Wash it thoroughly by stirring it. Let it settle two or three hours. Draw it off again, and add to the first. Then, with another pint of water, wash the precipitate once more, draw it off, and mix all the solutions together. Put them into a clean iron kettle, and, on a slow fire, boil it down gradually until it stands at 33° Baumé, at 220° Fahrenheit. Then take it off of the fire, and stand it aside to cool until it reaches 104° Fahrenheit. In the meantime take two pounds of clear tallow, try it out and strain it, and to it add four ounces of olive-oil. When this mixture has also cooled to 104° Fahrenheit, add to it twenty ounces of the lye at 104° Fahrenheit, in which one-half ounce of sulphate of zinc has been dissolved, stirring rapidly and continually until the thermometer reaches 100° Fahrenheit. Extract of ox-gall is then added at the rate of one-half ounce to each pound of soap. Then sift in gradually one ounce of powdered borax, and add three and a half ounces of chloride of lime which has previously been thoroughly rubbed up in a mortar to a thin, creamy paste, with four ounces of the lye, the temperature of which should also be about 100° Fahrenheit. Add gradually and stir continually and rapidly until the saponification of the mass has become completed, and a complete circle can be drawn on the surface, and the temperature has commenced to rise to 90°. Then pour it into a frame, and, after standing twenty-four hours, it can be taken out and cut up. A small excess of lye is added to this soap, in order to overcome the harshness which the lime would otherwise produce, as is also the borax, which, being a very mild alkali, renders the soap very fine and mild, so as not to injure the most delicate skin or fabric, or produce an irritating effect on sores or abrasions of the skin of any kind.

The sulphate of zinc is added, as it is to-day the best external remedy in existence for the cure of nearly all the skin diseases known, and, in the proportion that it is used in this soap, it will at once relieve and permanently cure any eruptions, pimples, chaps, or any other roughness to the face or hands, or any other part of the body; and it is also very beneficial to the eyes, as it is the curative medium in nearly all eye-waters or lotions in use, and in this combination with chloride of lime, in a soap of uniform and reliable strength, will be found far superior for the purposes named.

The extract of ox-gall prevents the possibility of the chlorine destroying the colors in colored goods.

The most important addition to this soap—the chloride of lime—must be mixed with a portion of the lye, so that a portion of the chlorine will unite with the lime of the lye, and thus, by becoming somewhat diluted, it is more readily and more evenly distributed through the mass of the soap. This requires the utmost care, and all the rules of temperature and specific gravity must be strictly followed in order to make a perfect soap in the strength of the chlorine.

Though I consider it best, and prefer to use the various ingredients in the proportions herein named, still I do not absolutely confine myself thereto, as I may find that they may be changed to produce soap of various qualities.

I do not claim, broadly, a soap containing a soluble chloride or hypochlorite mixed and compounded with the same or previously-made soap; but

Having thus fully described my invention, what I claim as new, and desire to secure by Letters Patent, is—

2. The combination of ox-gall, sulphate of zinc, and chloride of lime with the essential ingredients for making soap, substantially for the purposes set forth.

In testimony that I claim the foregoing as my own, I affix my signature in presence of two witnesses.

HENRY S. LESHER.